United States Patent
Maffeis

(10) Patent No.: US 7,452,017 B2
(45) Date of Patent: Nov. 18, 2008

(54) EXPANDABLE FINGER GRIPPER

(75) Inventor: Giuseppe Maffeis, Roncadelle (IT)

(73) Assignee: Gimatic S.p.A, Roncadelle (Brescia) (IT)

( * ) Notice: Subject to any disclaimer, the term of this patent is extended or adjusted under 35 U.S.C. 154(b) by 0 days.

(21) Appl. No.: 11/696,389

(22) Filed: Apr. 4, 2007

(65) Prior Publication Data
US 2007/0241578 A1    Oct. 18, 2007

(30) Foreign Application Priority Data
Apr. 12, 2006    (IT)    ............... BS 2006 A 000083

(51) Int. Cl.
B25J 15/00    (2006.01)
B66C 1/54    (2006.01)

(52) U.S. Cl. .................... 294/93; 294/88; 294/100; 279/2.17

(58) Field of Classification Search ............... 294/93, 294/98.1, 63.2, 86.24, 88, 100; 279/2.17, 279/2.22
See application file for complete search history.

(56) References Cited
U.S. PATENT DOCUMENTS 3,052,494 A * 9/1962 Williamson ............... 294/93
3,134,620 A * 5/1964 Blaisdell .................. 294/88
4,168,073 A * 9/1979 LaRue .................... 279/2.09
4,173,368 A * 11/1979 Haverbusch ............... 294/88
4,770,456 A * 9/1988 Phillips et al. ............ 294/93
5,282,888 A * 2/1994 Fukawa et al. ............ 118/500

* cited by examiner

Primary Examiner—Dean J Kramer
(74) Attorney, Agent, or Firm—McGlew & Tuttle, P.C.

(57) ABSTRACT

This invention relates to a pneumatically controlled finger gripper that has a supporting body (111) forming a chamber. A fixed axial rod (119) is secured to a proximal part of the body, extending in the chamber and emerging from a distal part of the body. A compression disk (113) is connected to the fixed rod. A pneumatic control piston (112) is guided along the axial rod and moves in the chamber (115) with respect to the compression disk (113) between an inactive position, at a distance from the compression disk, and a forward active position, near the compression disk. A flexible gripper element (114) is mounted between the compression disk (113) and control piston (112). The flexible gripper element moves between a contracted position and an expanded position in response to the movements of the control piston between the inactive and active positions of the compression disk.

20 Claims, 2 Drawing Sheets

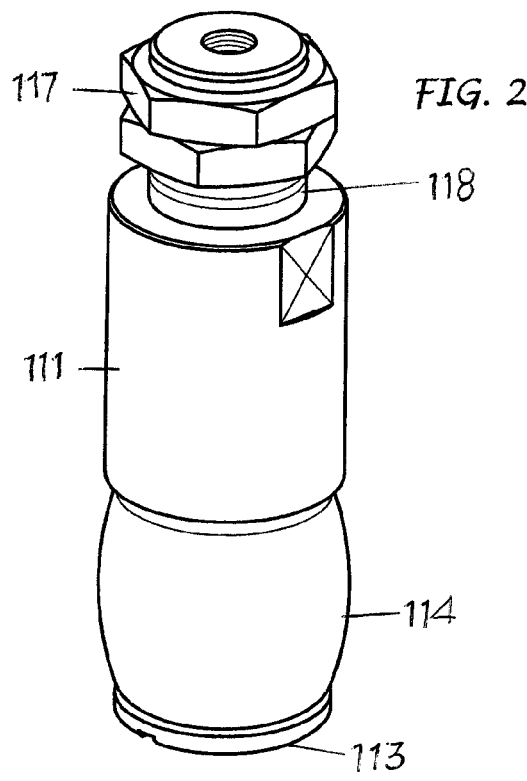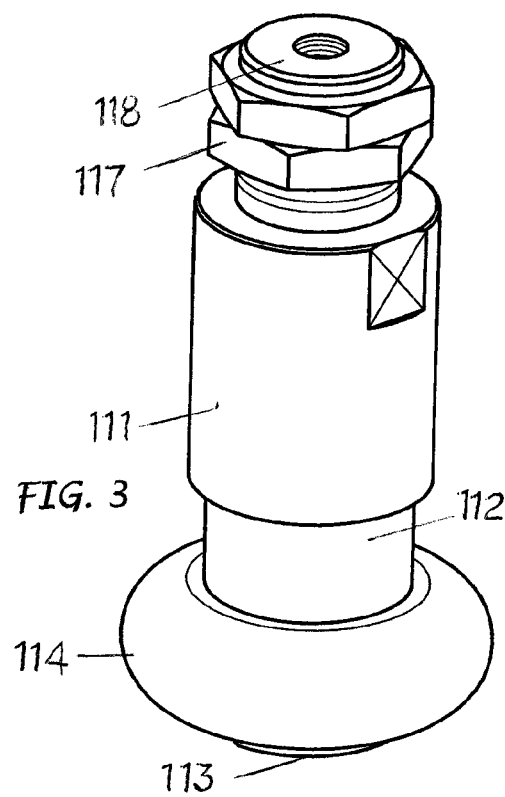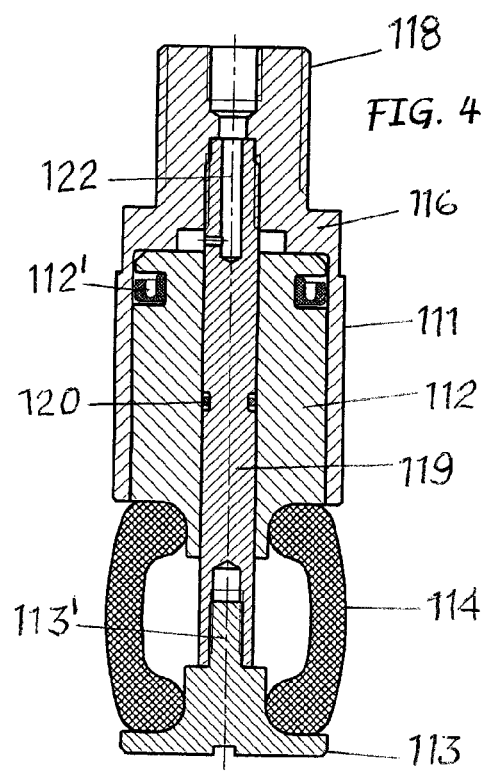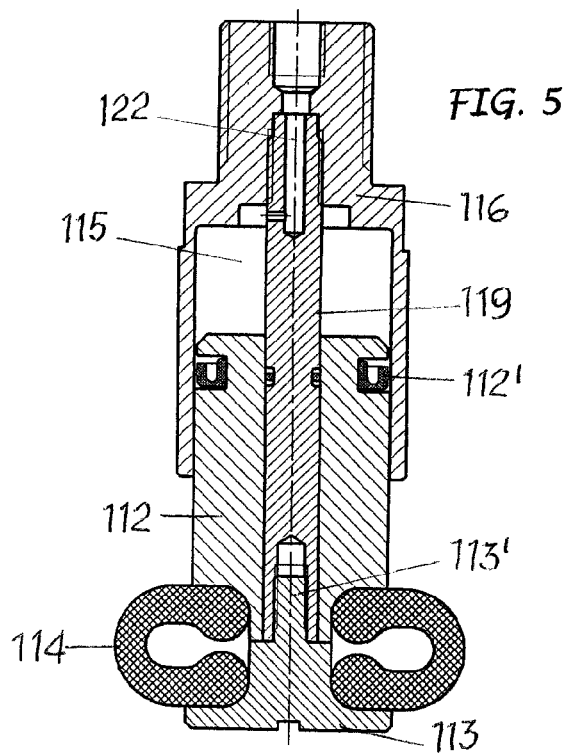

EXPANDABLE FINGER GRIPPER

FIELD OF THE INVENTION

This invention concerns a pneumatically controlled expandable finger gripper to grip and handle casings, objects or containers, by gripping them externally or also internally when there is a cavity.

STATE OF THE TECHNIQUE

In a previous, not yet published patent application BS 2006 A 000071 in the name of the same applicant, a pneumatically controlled expandable finger gripper was proposed, which is expandable by means of mechanical devices starting from a contracted position, suitable to avoid the complexity and disadvantages of an inflatable finger of the previous technique, but having a limitation from the practical point of view in that it is not suitable to effortlessly grip casings or objects if they are placed above or adjacent to a plane.

OBJECT AND SUMMARY OF THE INVENTION

It is instead an object of this invention to propose a pneumatically controlled expandable finger gripper having the same prerogatives and the same operating function as the one in the abovementioned patent application, but configured differently so as to be able to reliably grip casings or objects, even small in size and/or thickness which are above or close to a flat plane or another fixed element.

Such an object is achieved according to the invention with a finger gripper comprising a supporting body with a proximal and a distal part forming a chamber, closed at the proximal part and open at the distal part, a fixed axial rod, constrained with a first end to the proximal part of said body, extending into said chamber and emerging from it with a second end, a compression disk attached to the second end of said fixed rod, a pneumatic control piston guided along said rod and moving in said chamber and relatively with the compression disk between a backward inactive position, away from the compression disk, and a forward active position, near the compression disk, and a flexible gripper element, located between the compression disk and the control piston and moving between a contracted and expanded positions in response to the movements of said piston with respect with the compression disk when moving between the inactive and active positions.

BRIEF DESCRIPTION OF THE DRAWINGS

Further details of the invention will become more evident from the following description made in reference to the enclosed indicative and not binding drawings, in which:

FIGS. 2 and 3 show an external view of the tool as assembled, with the gripper element in the contracted and expanded position respectively; and FIGS. 4 and 5 show a longitudinal section of the tool with the gripper element in the contracted and expanded position respectively.

DETAILED DESCRIPTION OF THE INVENTION

Figure 1:
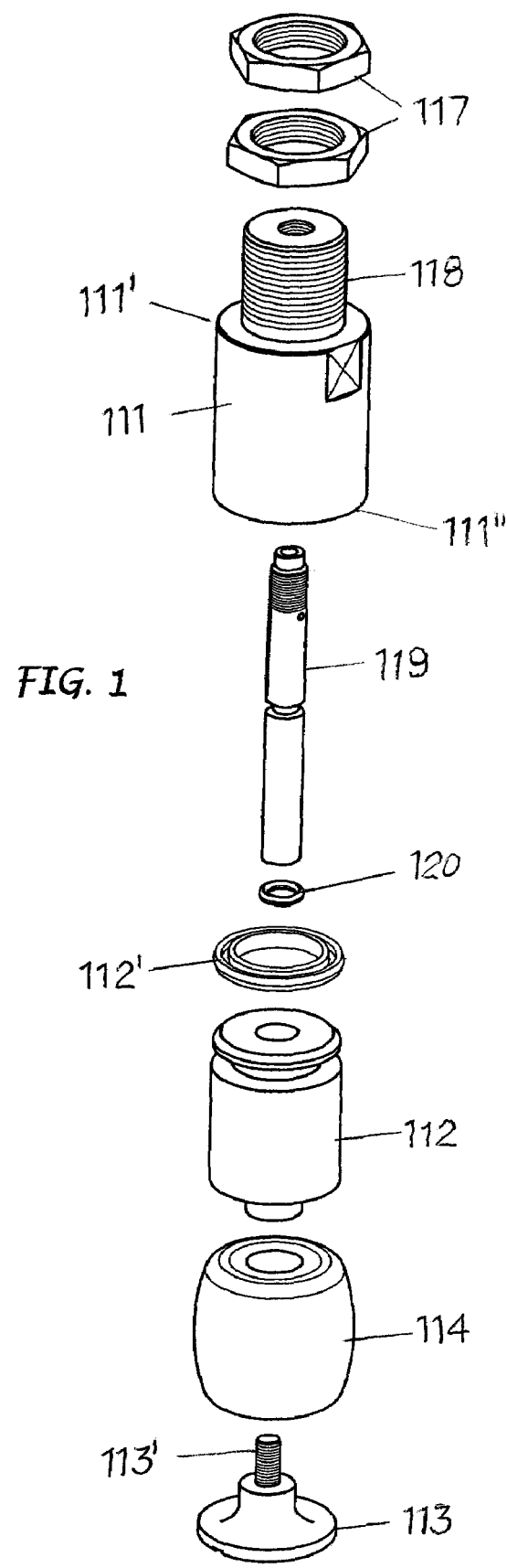
FIG. 1 shows an exploded view of the component of the finger gripper according to the invention.

As shown, the finger gripper basically comprises a supporting body 111, a pneumatic control piston 112, a compression disk 113 and an expandable gripper element 114.

The supporting body 111 has a proximal end 111' and a distal part 111" and forms internally a chamber 115, which at the proximal part is closed by a wall 116, whereas at the distal part it is open. In the proximal part, the supporting body 111 may have connection or fitting 118 provided with nuts 117 to connect the finger gripper to any type of support or manipulator—not shown.

The control piston 112 is equipped with at least one peripheral seal 112' and it is housed and moves in said chamber 115, protrudes from the distal part 111" of the supporting body 111, said piston 112 is guided along a fixed central rod 119, one end of which is fixed to the wall 116 of the supporting body, whereas its opposite end extends beyond the piston.

The compression disk 113, which can be flat as shown in the drawings or conical, is connected to the other end of the fixed rod 119 by means, for example, of a threaded shank 113'.

The expandable gripper element 114 is basically tubular and made of a flexible material, such as rubber, polyurethane, silicon or similar. It is initially configured with a convex barrel-shaped wall and suitable for its expansion towards the external. The external surface of said gripper element 114 can be continuous, that is, uniform or it can be shaped or corrugated.

It is, however, mounted between the compression disk 113 and the facing end of the control piston 112, around the connecting area of the fixed rod 119 with the compression disk 113.

The control piston 112 is movable in the chamber, along the fixed rod 119 together with the compression disk 113, between a retracted, inactive position, and a forward, active position.

When it is the inactive position, the piston 112 is moved towards the proximal wall 116 of the supporting body 111, at a distance from the compression disk 113, and the flexible gripper element 114 is relaxed and in the contracted condition as shown in FIGS. 2 and 4. On the contrary, when it is in the active position the piston is moved towards the compression disk 113 and the flexible gripper element 114 is compressed and therefore in an expanded condition, lodged between said compression disk and the piston shown in FIGS. 3 and 5.

The control piston 112 is, and normally remains in the retracted, inactive position, due to the innate flexibility of the gripper element 114 and/or with the help of a possible return spring—not shown. The control piston 112 is on the other hand moved into the active position by a fluid under pressure, usually air, fed to the chamber 115 through a feed hole provided in a radial position in the supporting body 111 or, as shown in the drawings, through a conduit 122 provided, longitudinally, in the proximal wall 116 and in a radial position, in the piston itself.

When contracted, the gripper element can be inserted into the cavity of an object or container to be handled. Then, by feeling a fluid under pressure into the chamber 115, the piston moves towards the compression disk 113 which remains idle and which may even rest on a plane. In this way, the forward movement of the piston causes the gripper element 114 to expand so as to fit tightly in the cavity in which it has been inserted in order to be able to reliably handle any hollow object or container.

Furthermore, the gripper finger, besides gripping and handling objects and containers by being applied to the inside of a cavity, it can also be used, in combination with at least another similar gripper finger or complementary jig, to engage and handle objects and bodies by being applied externally even when they are on or adjacent to a plane, given that the compression disk can also rest on or be positioned up against such plane and that the gripper element remains in contact also when it is compressed.

The invention claimed is:

1. A pneumatically controlled finger gripper, comprising:
   a supporting body with a proximal part and a distal part defining a distal end of said supporting body, said proximal part and said distal part forming a chamber closed at the proximal part and open at the distal part;
   a fixed axial rod with a first end attached to said proximal part of said supporting body, said fixed axial rod extending in said chamber such that a second end of said fixed axial rod extends to a position located outside of said chamber;
   a compression disk connected to said second end of said fixed axial rod;
   a pneumatically controlled piston guided along said fixed axial rod, said piston being movable moving in said chamber with respect to said compression disk between a retracted, inactive position and a forward active position, said piston being located at a first distance from said compression disk when said piston is in said inactive position, said piston being located at a second distance from said compression disk when said piston is in said forward active position, said second distance being less than said first distance; and
   a flexible gripper element located between said compression disk and said control piston, said gripper element moving between a contracted position and an expanded position with respect to said compression disk when said control piston moves between said inactive position and said active position, said gripper element having an upper gripper element portion in contact with said piston and a lower gripper element portion in contact with said compression disk, said upper gripper element portion being located adjacent to said distal part of said supporting body when said gripper element is in said contracted position, said gripper element being located at a spaced location from said distal part of said supporting body when said gripper element is in said expanded position.

2. A gripper finger according to claim 1, wherein said chamber in the supporting body is fed by a fluid under pressure to move said piston at least from the inactive retracted position to the forward active position, said gripper element being in said contracted position when said piston is in said inactive retracted position, said gripper element being in said expanded position when said piston is in said forward active position, said inactive position being maintained by the flexibility of the gripper element.

3. A gripper finger according to claim 2, wherein said flexible gripper element is substantially tube shaped, said flexible gripper element being formed of rubber, polyurethane, or silicon, said flexible gripper element having a convex wall, said convex wall being flexible such that said gripper element expands only in a radial direction when said gripper element moves from contracted position to said expanded position.

4. A gripper finger according to claim 2, wherein the proximal part of the supporting body has a connection or joint for connecting said supporting body to a manipulator.

5. A gripper finger according to claim 2, wherein said compression disk has a compression disk surface, said compression disk surface having a flat shape or a convex shape.

6. A gripper finger according to claim 1, wherein said flexible gripper element is substantially tube shaped, said flexible gripper element being formed of rubber, polyurethane, or silicon, said flexible gripper element having a convex wall, said convex wall being flexible such that said flexible gripper element expands only in a radial direction when said flexible gripper element moves from said contracted position to said expanded position.

7. A gripper finger according to claim 6, wherein said flexible gripper element has a continuous and uniform external surface or an undulated external surface or a corrugated external surface.

8. A gripper finger according to claim 7, wherein said proximal part of the supporting body has a connection or joint for connecting said supporting body to a manipulator.

9. A gripper finger according to claim 7, wherein the compression disk is either flat or convex.

10. A gripper finger according to claim 6, wherein said proximal part of the supporting body has a connection or joint for connecting said supporting body to a manipulator.

11. A gripper finger according to claim 6, wherein said compression disk has a flat shape or a convex shape.

12. A gripper finger according to claim 1, wherein said proximal part of the supporting body has a connection or joint for connecting said supporting body to a manipulator.

13. A gripper finger according to claim 12, wherein said compression disk has a flange portion, said flange portion having a flat shape or a convex shape.

14. A gripper finger according to claim 1, wherein said compression disk has a flange portion, said flange portion having a flat shape or a convex shape.

15. A gripper finger according to claim 1, wherein said compression disk has a radially extending compression disk flange portion, said compression disk flange portion having an inner flange surface, said piston having a radially extending piston portion and an axially extending piston portion, said upper gripper portion being in contact with said radially extending piston portion and said axially extending piston portion, said lower gripper element portion being in contact with said inner flange surface.

16. A gripper finger according to claim 1, wherein said compression disk has a substantially radially extending compression disk portion and a substantially axially extending compression portion, said piston having a radially extending piston portion and an axially extending piston portion, said upper gripper portion engaging said radially extending piston portion and said axially extending piston portion, said lower gripper element portion engaging said substantially radially extending compression disk portion and said substantially axially extending compression portion.

17. A gripper finger according to claim 1, wherein a portion of said piston is located outside of said chamber when said piston is in said forward active position.

18. A pneumatically controlled finger gripper, comprising:
   a supporting body with a proximal part and a distal part defining a distal end of said supporting body, said proximal part and said distal part forming a chamber having an opening at said distal part;
   a fixed axial rod with a first end and a second end, said first end of said fixed axial rod being connected to said proximal part of said supporting body, said fixed axial rod extending in said chamber, said second end of said fixed axial rod being located at a spaced location from said distal part of said supporting body such that said second end of said fixed axial rod is located at a position outside of said chamber;
   a compression disk fixed to said second end of said fixed axial rod;
   a pneumatically controlled piston movable along said fixed axial rod from a retracted inactive position to a forward active position; and a flexible gripper element located between said compression disk and said control piston, said gripper element being moveable from a contracted position to an expanded position, said gripper element being in said contracted position when said control piston is in said retracted inactive position, said gripper element being in said expanded position when said control piston is in said forward active position, said compression disk having a radially extending compression disk flange portion, said compression disk flange portion having an inner flange surface, said piston having a radially extending piston portion and an axially extending piston portion, said gripper element engaging said radially extending piston portion and said axially extending piston portion, said gripper element portion engaging said inner flange surface.

19. A gripper finger according to claim 18, wherein said gripper element is located at a spaced location from said distal part of said supporting body when said gripper element is in said expanded position, and a portion of said piston is located outside of said chamber when said piston is in said forward active position.

20. A gripper finger according to claim 18, wherein said upper gripper element portion is located adjacent to said distal part of said supporting body when said gripper element is in said contracted position, said gripper element being located at a spaced location from said distal part of said supporting body when said gripper element is in said expanded position.

* * * * *